Dec. 28, 1954 R. A. SHAW 2,698,037
VEGETABLE CUTTING MACHINE HAVING VERTICAL
AND HORIZONTAL ROTARY DISK CUTTERS
Filed March 30, 1951 2 Sheets-Sheet 1
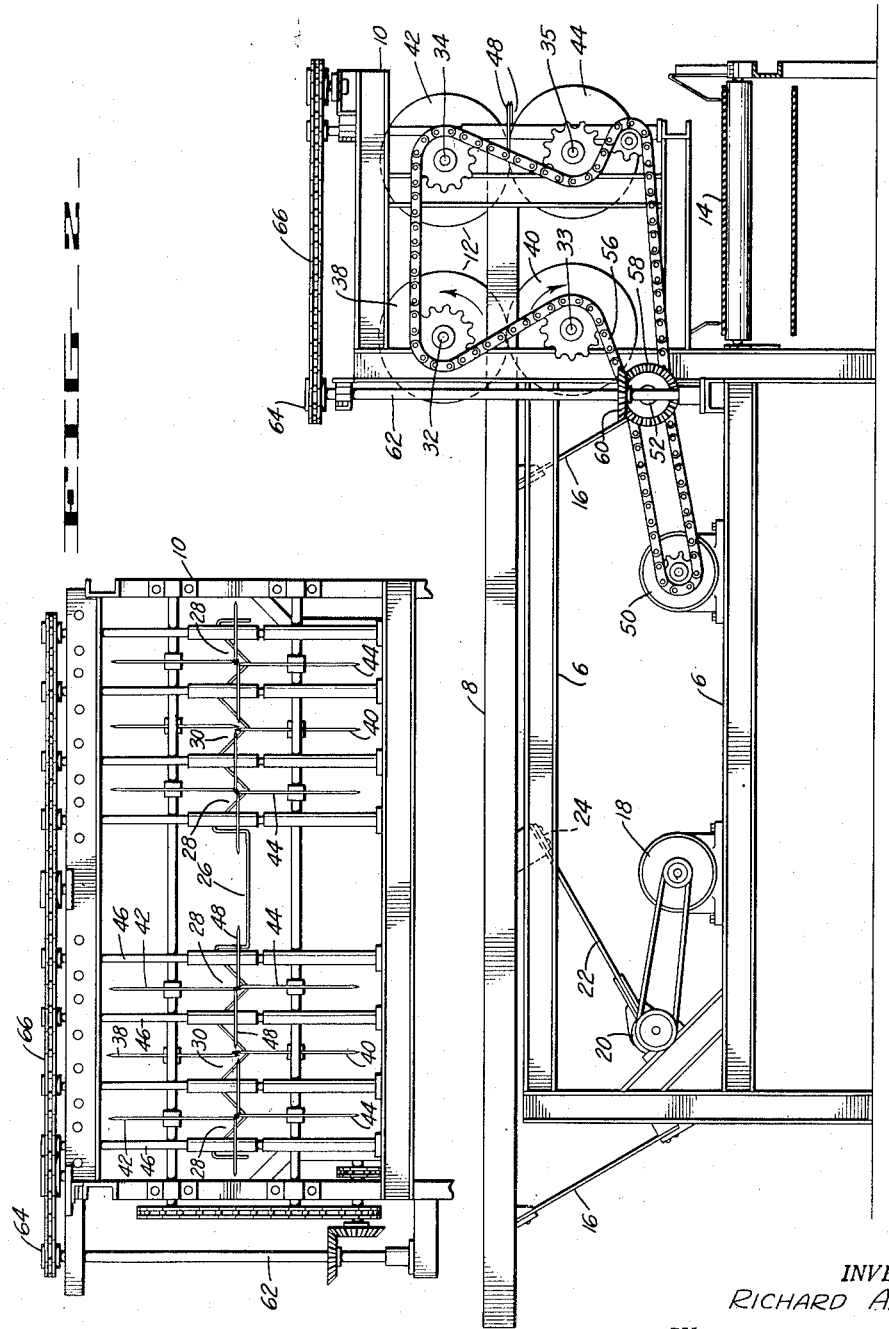
INVENTOR.
RICHARD A. SHAW
BY Dec. 28, 1954   R. A. SHAW   2,698,037
VEGETABLE CUTTING MACHINE HAVING VERTICAL
AND HORIZONTAL ROTARY DISK CUTTERS
Filed March 30, 1951   2 Sheets-Sheet 2
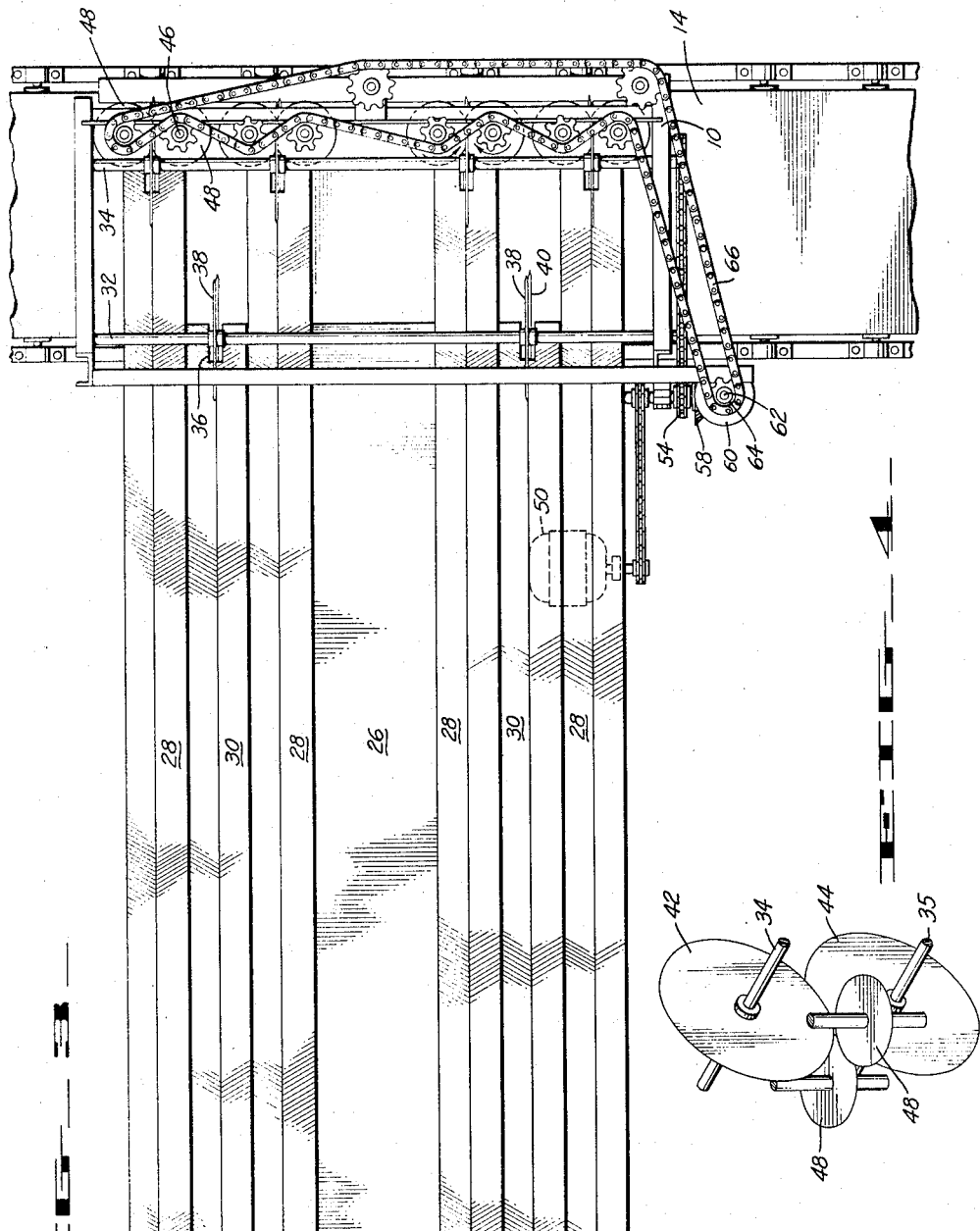
INVENTOR.
RICHARD A. SHAW
BY

2,698,037

VEGETABLE CUTTING MACHINE HAVING VERTICAL AND HORIZONTAL ROTARY DISK CUTTERS

Richard A. Shaw, Watsonville, Calif.

Application March 30, 1951, Serial No. 218,442

2 Claims. (Cl. 146—73)

This invention relates to a machine for cutting vegetables and particularly to a machine for cutting vegetables such as broccoli, celery or cauliflower. The machine will be described in connection with the cutting of broccoli, but its use is not restricted to broccoli and it may be used for cutting various like materials.

In the preparation of a vegetable such as broccoli for marketing and particularly for preparation of broccoli for packaging small boxes of a uniform size which may be frozen, it is necessary to cut the broccoli into a number of small, uniform pieces. As broccoli is brought in from the growing field the stalks are of random lengths and diameters and it is necessary to cut the stalks to an approximately uniform cross section. The machine of the present invention relates to the cutting of the broccoli to a substantially uniform cross section. The machine is also useful in orienting broccoli for trimming to length.

When broccoli is delivered from the field, the stalks are not uniform in diameter and it is first necessary to cut many of the stalks either once or twice in a direction parallel to the main axis of the stalk so that each stalk of broccoli has approximately a uniform cross sectional area. Such a cut will be hereafter referred to as an "axial cut." This operation has been conducted in the past by hand and it is a primary object of the present invention to provide a machine which will perform one or more axial cuts on a stalk of broccoli.

It is a further object of this invention to provide a machine for cutting broccoli having a high productive capacity and a low labor requirement.

It is a further object of this invention to provide a machine which is relatively inexpensive to manufacture and to maintain.

Another object of the present invention is to provide a machine for trimming broccoli which has a sorting as well as a cutting function and which wastes a minimum of broccoli processed.

Other objects and features of the invention will appear hereinafter wherein a preferred embodiment of the machine is disclosed.

The invention, as incorporated in a machine for cutting broccoli, will be described in detail with reference to the accompanying drawings wherein:

Figure 1 represents a side elevation of a preferred embodiment of my broccoli trimming machine.

Figure 2 represents a front elevation of a portion of the machine shown in Figure 1, and shows in detail the arrangement of the cutting knives and the V-shaped troughs which guide the broccoli to the cutting knives.

Figure 3 is a plan view of the machine shown in Figure 1.

Figure 4 is a perspective view of the cutting knives which may be used on the broccoli trimming machine showing the arrangement of the several pairs of rotary knives.

The machine illustrated comprises a framework 6 designed to support the machine as a whole and made up of suitable structural steel shapes. Framework 6 supports a vibrating table 8 and a secondary framework 10, the secondary framework 10 supporting pairs of co-operatively positioned rotary cutting knives, designated generally as 12, which rotate in a vertical plane to perform a cutting operation. The rotary knives have sharp edges, the edges overlapping slightly. Located beneath the cutting knives 12 is a conveyor 14 for receiving the broccoli which has passed over table 8 and for conveying the broccoli to a further cutting operation wherein the broccoli is cut to length, as will be described.

The vibrating table 8 is supported on framework 6 by leaf springs 16 so that the table 8 may vibrate relative to the framework 6. For accomplishing this movement, a prime mover 18 is mounted on framework 6 to drive an eccentric 20 connected to the vibrating table by a leaf spring 22 and an arm 24 mounted thereon. Leaf springs 16 support the table at rest in a retracted position. As the eccentric 20 is rotated, springs 16 are flexed and the table is moved forward against the bias of springs 16 into a position where the table is closer to the knives 12. Since the springs 16 resist the forward movement of the table and aid in the table movement to the rear, the table moves relatively slowly as it goes forward and very rapidly as the table is retracted so that any material placed on the table while it is being vibrated tends to move in a forward direction and toward the knives 12 because of the inertia in the material.

The vibrating table 8 is made of relatively thin material such as sheet iron and, as can be seen from Figures 2 and 3, is formed with a large center trough 26 of generally rectangular cross section, and three V-shaped troughs on either side of the center trough, some of which have been designated 28 and others 30, for reasons which will be hereinafter apparent. Troughs 26 and 30 terminate at a point even with, or just slightly beyond shaft 32 while troughs 28 terminate even with or just slightly beyond shaft 34.

Each trough 28 and 30 has a slot 36 at its terminal end and a pair of the vertical rotary cutting knives 12 fit in each slot substantially at the point where the two knives constituting each pair are in a mutual cutting contact. A plurality of sets of vertical rotary knives are employed on the machine, two sets of knives being mounted on shafts 32 and 33 and four sets of vertical knives being mounted on shafts 34 and 35.

Referring now to the specific knives, mounted on shafts 32 and 33 are rotating cutting knives 38 and 40, each set of knives overlapping slightly and performing a cutting operation at their area of intersection or overlap. As is apparent from Figures 1 and 3, knives 38 and 40 will cut any material which is in trough 30, but will not come in contact with the materials in the other troughs. A second set of vertical cutting knives is mounted on shafts 34 and 35. These knives are identical in structure with knives 38 and 40 and it is apparent from their position that knives 42 and 44 will cooperate to perform a cutting operation on any material in troughs 28, but will not be in contact with material in the other troughs.

Mounted on sub-frame 10 are a number of vertical shafts 46, each of which has attached thereto a small rotating cutting knife 48 adapted to perform a cut in a horizontal plane. Knives 48 cooperate in pairs to perform a cutting operation at their area of overlap and it should be particularly noted that their area of intersection is spaced close to the area of intersection of knives 42 and 44, as is shown in Figure 4, and that this area of intersection is slightly above the bottom of the V-troughs 28. The distance above the bottom of V-troughs 28 at which knives 48 are located is determined by the size of the material being cut. For instance, if the stalks being cut in trough 28 have an average diameter of 1", the knives are located a little more than ½" above the bottom of the trough so that the cut is made at approximately the center of the stalk.

To drive the knives I provide a second prime mover 50 mounted on frame 6 and which drives the shaft 52 having thereon a sprocket 54 for driving a chain 56 which in turn passes over a sprocket on each of shafts 32, 33, 34 and 35, causing these shafts and the knives mounted thereon to rotate in the direction indicated in Figure 1. Also mounted on shaft 52 is a bevel gear 58 which drives a second bevel gear 60 on shaft 62. At the top of shaft 62 a sprocket 64 is mounted which drives chain 66 which in turn drives shafts 46. Each set of rotary knives revolves in the direction shown in Figures 1 and 3, the knives of each pair being driven in opposite directions so that broccoli in contact with a knife pair will be drawn into the knives, cut and forced on its way.

The vibrating table 8 serves not only as a means of transporting the broccoli to the cutting knives, but also as a sorting table. In operation, broccoli is dumped at the left hand end in Figures 1 and 3 of table 8, whereupon it is propelled toward the cutting knives by the vibratory action of the table. While the machine will operate on broccoli fed into the knives head first or butt first, a more accurate cut is obtained and the machine is more positive in operation if the broccoli is fed so that the butt of the stalk enters the knives first. After the broccoli has been placed on the left end of table 8 it is sorted by hand, those pieces having a diameter approximately of the desired size being placed in trough 26, those pieces requiring a single axial cut to reduce them to the desired size being placed in troughs 30 and those pieces requiring two axial cuts, i. e., division into four pieces, being placed in troughs 28. It is also possible to pre-sort the broccoli before it reaches table 8, in which case an endless belt sorting table can be used, which is divided into sections corresponding with the troughs on vibrating table 8; broccoli which has been previously sorted drops into the appropriate trough, depending upon its size, at the left end of table 8. If this pre-sorting operation is carried out, it is only necessary to perform a single operation on table 8, that is, hand-turning so that all broccoli approaches the cutting knives butt end toward the knives.

The conveyor 14 located under the cutting knives moves at right angles to the movement of the broccoli on vibrating table 8 so that after the broccoli has been cut its general orientation on belt 14 will be crosswise of the belt. This crosswise orientation of the broccoli leaving the machine is advantageous inasmuch as it facilitates the operation of the next machine which trims the broccoli to length.

I claim:
1. A cutting machine of the class described comprising in combination a movably supported horizontal table adapted to be vibrated, a V-shaped trough in said table, a single pair of rotary cutting knives supported for rotation in a vertical plane with said knives overlapping slightly above an imaginary continuation of the bottom of the V-shaped trough, means for rotating said knives in opposite directions, and means for vibrating said table to feed material placed thereon into cutting engagement with said rotary knives.

2. A machine of the class described comprising in combination a vibrating horizontal table having a V-shaped trough therein, a first single set of rotary cutting knives having a point of intersection at a point slightly above an imaginary continuation of the bottom of the terminal portion of the V-shaped trough, and a second single set of rotary cutting knives located at an angle of 90° to the first set of cutting knives and adjacent thereto. said vibrating table feeding material placed thereon into contact with said rotary cutting knives.

References Cited in the file of this patent

UNITED STATES PATENTS

| Number | Name | Date |
| --- | --- | --- |
| 267,320 | Betts | Nov. 14, 1882 |
| 334,820 | Sturtevant | Jan. 26, 1886 |
| 1,028,510 | Wefing | June 4, 1912 |
| 1,072,628 | Lipscomb | Sept. 9, 1913 |
| 1,239,926 | Luer | Sept. 11, 1917 |
| 1,555,106 | Doe | Sept. 29, 1925 |
| 1,794,009 | Fuhremann | Feb. 24, 1931 |
| 1,948,905 | Duckworth | Feb. 27, 1934 |
| 2,100,455 | Souther et al. | Nov. 30, 1937 |
| 2,108,951 | Thompson | Feb. 22, 1938 |
| 2,540,014 | Smith | Jan. 30, 1951 |

FOREIGN PATENTS

| Number | Country | Date |
| --- | --- | --- |
| 67,857 | Germany | Apr. 7, 1893 |